(12) United States Patent
Yoon et al.

(10) Patent No.: US 6,448,707 B1
(45) Date of Patent: Sep. 10, 2002

(54) CATHODE RAY TUBE PANEL

(75) Inventors: Cheon Yoon, Seongnam-si; Dong-Sang Kim; Byung-Chul Lim, both of Suwon-si; Chang-Wook Bin, Incheon, all of (KR)

(73) Assignee: Samsung Corning Co., Ltd., Kyungki-Do (KR)

( * ) Notice: Subject to any disclaimer, the term of this patent is extended or adjusted under 35 U.S.C. 154(b) by 0 days.

(21) Appl. No.: 09/456,054

(22) Filed: Dec. 7, 1999

(30) Foreign Application Priority Data

Dec. 7, 1998 (KR) .............................. 98-53330

(51) Int. Cl.$^7$ .............................................. H01J 31/00
(52) U.S. Cl. ................... 313/480; 313/477 R; 501/64; 501/69; 501/70
(58) Field of Search ................... 313/477 R, 480, 313/495, 496, 497, 110; 501/64, 69, 70; 65/30.14, 43

(56) References Cited

U.S. PATENT DOCUMENTS

| | | | | |
|---|---|---|---|---|
| 2,991,591 A | | 11/1961 | Gabor | |
| 4,065,697 A | * | 12/1977 | Steierman | 313/480 |
| 4,483,452 A | * | 11/1984 | Blanding et al. | 313/477 R |
| 5,296,294 A | * | 3/1994 | Suzuki et al. | 501/69 |
| 5,420,475 A | * | 5/1995 | Nakamura et al. | 313/474 |
| 6,133,686 A | * | 10/2000 | Inoue et al. | 313/477 R |
| 6,252,349 B1 | * | 6/2001 | Inoue et al. | 313/495 |
| 6,268,704 B1 | * | 7/2001 | Nishizawa et al. | 313/480 |
| 2001/0023230 A1 | * | 9/2001 | Santoku et al. | 501/64 |
| 2001/0049327 A1 | * | 12/2001 | Hachitani | 501/69 |

FOREIGN PATENT DOCUMENTS

| | | |
|---|---|---|
| JP | 7-021944 A | 1/1995 |
| JP | 8-138579 A | 5/1996 |

* cited by examiner

*Primary Examiner*—Nimeshkumar D. Patel
*Assistant Examiner*—Mariceli Santiago
(74) *Attorney, Agent, or Firm*—Katten Muchin Zavis Rosenman

(57) ABSTRACT

A substantially rectangular glass panel for a cathode ray tube is made of a glass having a linear X-ray absorption coefficient of at least 34 cm$^{-1}$ at a wavelength of 0.6 Å, with the dimensions of the panel satisfying the condition of $0.07 \leq T/\sqrt{D} \leq 0.09$; and the panel is prestressed so that the surface of the face of the panel has a residual compressive stress ranging from 5 to 25 MPa, wherein T is the central thickness of the face of the panel in inches and D is the maximum diagonal line length of the face of the panel in inches.

4 Claims, 1 Drawing Sheet

CATHODE RAY TUBE PANEL

FIELD OF THE INTENTION

The present invention relates to a glass panel for a cathode ray tube, and more particularly, to a light-weight cathode ray tube panel having a reduced glass thickness and a high X-ray absorption coefficient.

BACKGROUND OF THE INVENTION

A cathode ray tube(CRT) such as a computer monitor and television picture tube comprises three principal parts: a glass panel through which video displays may be made; a funnel which has a yoke determining the course of electron beam generated from an electron gun and is attached to the panel; and a neck equipped with the electron gun. The glass panel is required to have, among others, the strength to withstand a static stress resulting from a pressure difference between the outside atmosphere and the internal vacuum as well as the ability to shield harmful X-ray radiation below a safety regulation level.

For this reason, conventional CRT panels have remained relatively thick, entailing such disadvantages as low productivity and high material costs. Therefore, there have been attempts to develop a light-weight glass panel having a high mechanical strength and a reduced glass thickness.

For example, U.S. Pat. No. 2,991,591 suggests that the thickness of a glass panel may be reduced by imparting residual compressive stress on the face of the glass panel, e.g., by prestressing the plate in order to compensate for the static stress; and Japanese Patent Laid-Open Publication Nos. 8-138579 and 7-21944 disclose that the thickness of the face area of a glass panel may be reduced by using a similar physical strengthening method. However, the extent of thickness reduction achievable by the above methods is limited because of their inability to meet the X-ray emission specification.

SUMMARY OF THE INVENTION

Accordingly, it is a primary object of the present invention to provide a light-weight, thin panel for a cathode ray tube having a high X-ray absorption coefficient and mechanical strength.

It is another object of the present invention to provide a cathode ray tube comprising the inventive glass panel.

In accordance with the present invention, there is provided a substantially rectangular glass panel for a cathode ray tube, characterized in that the panel is made of a glass having a linear X-ray absorption coefficient of at least 34 cm$^{-1}$ at a wavelength of 0.6 Å; the dimensions of the panel satisfy the condition of $0.07 \leq T/\text{sqrt}(D) \leq 0.09$; and the panel is prestressed so that the surface of the face of the panel has a residual compressive stress ranging from 5 to 25 MPa, wherein T is the central thickness of the face of the panel in inches and D is the maximum diagonal line length of the face of the panel in inches.

BRIEF DESCRIPTION OF THE DRAWINGS

The above and other objects and features of the present invention will become apparent from the following description thereof, when taken in conjunction with the accompanying drawings wherein.

DETAILED DESCRIPTION OF THE INVENTION

Figure 1:
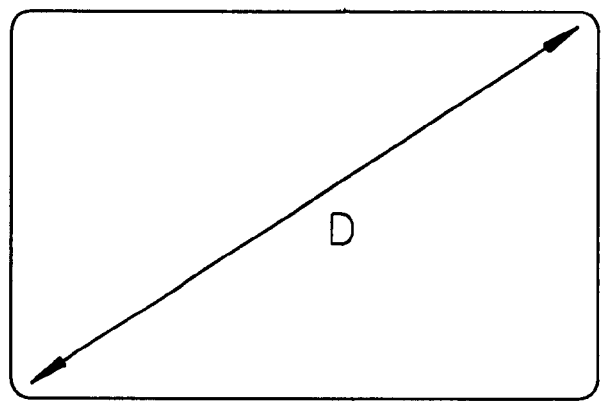
FIG. 1 provides a front view of a substantially rectangular face of a glass panel showing the maximum diagonal line of the face (D)
Figure 2:
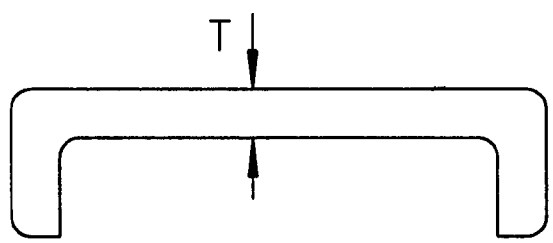
FIG. 2 depicts a sectional view of a glass panel showing the center thickness(T).

The present invention is to provide a light-weight glass panel for use in a cathode ray tube bulb by way of using a glass composition having a high X-ray absorption coefficient and prestressing the panel glass.

The extent of reduction in thickness and weight of a glass panel may be expressed as a weight reduction parameter K which is defined by formula(I):

$$K = T/\sqrt{D} \quad (I)$$

wherein: T is the central thickness of panel face in inches; and D is the maximum diagonal line length of the panel face in inches.

The conventional glass composition for a CRT glass panel has an X-ray absorption coefficient of about 28 cm$^{-1}$ at a wavelength of 0.6 Å, and to satisfy the regulated safety level of X-ray emission of 0.5 mR/hr, a CRT panel made thereof has to be relatively thick, a weight reduction parameter K being in the range of 0.09 to 0.10.

In contrast, the CRT glass panel of the present invention can be designed so that the weight reduction parameter ranges from 0.07 to 0.09, which corresponds to thickness reduction by 10 to 25%, as compared with the conventional glass composition. When K is less than 0.07, the panel does not have sufficient strength, and when K is over 0.09, the panel becomes unduly thick.

Further, in accordance with the present invention, the skirt area can be also reduced by 5 to 15% as compared with the conventional glass composition.

The glass panel of the present invention is prepared by a conventional molding process using a glass composition having a linear X-ray absorption coefficient at a wavelength of 0.6 Å is 34 cm$^{-1}$ or more. The glass composition for use in forming the inventive panel may contain, based on the total oxides, 56.0 to 58.5 wt % of $SiO_2$, 11.0 to 13.0 wt % of BaO, 7.5 to 9.0 wt % of SrO, 2.5 to 3.5 wt % of $ZrO_2$, 1.0 to 2.5 wt % of ZnO, 0 to 0.5 wt % of $Li_2O$, 4 to 7.5 wt % of $Na_2O$, 7 to 11 wt % of $K_2O$, 1 to 3 wt % of $Al_2O_3$, 0 to 0.2 wt % of MgO, 0 to 0.3 wt % of CaO, 0.3 to 0.5 wt % of $TiO_2$, 0.2 to 0.5 wt % of $CeO_2$, and 0.2 to 0.5 wt % of $Sb_2O_3$. It is preferred that the constituents of the glass composition satisfy formulae (II) to (IV):

$$0.58 \leq C_{BaO}/(C_{BaO} + C_{SrO}) \leq 0.62 \quad (II)$$

$$4.5 \leq C_{ZrO_2} + C_{ZnO} \leq 6.0 \quad (III)$$

$$0.52 \leq [C_{K_2O}/(C_{K_2O} + C_{Na_2O})] - 0.43 C_{Li_2O} \leq 0.58 \quad (IV)$$

wherein $C_{BaO}$, $C_{SrO}$, $C_{ZrO_2}$, $C_{ZnO}$, $C_{K_2O}$, $C_{Na_2O}$ and $C_{Li_2O}$ represent the contents in percent by weight of BaO, SrO, $ZrO_2$, ZnO, $K_2O$, $Na_2O$ and $Li_2O$, respectively.

In practicing the present invention, the glass panel is subjected to a physical strengthening process in accordance with the conventional prestressing method so as to impart residual compressive stress on the surface of the panel face which counteracts the static stress generated when the CRT interior in evacuated.

When a glass panel is cooled very slowly at a temperature ranging from the temperature at which the viscosity of the glass composition in accordance with ASTM standard becomes $10^{13.4}$ (a slow cooling temperature of glass) and the temperature at which the viscosity of the glass in accordance with ASTM standard becomes $10^{14.6}$ (a transformation temperature of glass), a conventional nonstressed panel is obtained.

In contrast, according to the physical strengthening process of the present invention, the cooling of the glass panel is conducted at a controlled temperature, time and rate so that a desired residual compressive stress is obtained. Preferably, the glass panel is cooled at a temperature ranging from 470 to 500° C. for an hour or less to give a residual compressive stress ranging from 5 to 25 MPa on the surface of the panel face.

When the residual compressive stress of the surface of the panel face is less than 5MPa, the strength of the glass panel is unsatisfactory, while when it is greater than 25 MPa, the cathode ray tube bulb becomes so unstable that it can be easily destroyed by the external force when applied to the front panel during missile or ball test.

The present invention also includes within its scope a cathode ray tube comprising the inventive glass panel. The cathode ray tube further comprises a funnel glass which has a yoke determining the course of electron beam generated from an electron gun and is attached to the panel and a neck equipped with the electron gun. The cathode ray tube can be manufactured by a conventional method.

The following Examples are intended to further illustrate the present invention without limiting its scope.

The properties of the panel glass in Examples 1 and 2 and Comparative Examples 1 to 4 were evaluated according to the following method.

(1) Maximum Vacuum Tensile Stress(kgf/cm$^2$)

The maximum vacuum tensile stress means the maximum static stress applied by the pressure difference between the outside atmosphere and is determined by using a simulation program (Winbulb, Samsung Corning, ANSYS) in the consideration of the various dimensions, e.g., maximum length of the diagonal line of the face area(D), the thickness of the center of the face area(T) and the thickness of the seal edge of the glass panel(S/E).

(2) X-ray Absorption Coefficient($\mu$, cm$^{-1}$)

The X-ray Absorption Coefficient($\mu$, cm$^{-1}$) of the glass was calculated by multiplying the density of the glass by the sum of mass absorption coefficients of the constituents measured at a wavelength of 0.6 Å.

(3) Residual Compressive Stress

The residual compressive stress, imparted on the surface of the panel face by a prestressing procedure, was determined by using Senarmont method.

(4) Hydrostatic Pressure Test

The interior of a bulb comprising the panel glass prepared in each of the Examples and Comparative Examples was filled with water and the bulb was placed in water. Then, an external pressure was applied and the pressure at which the bulb broke was recorded as the hydrostatic pressure of the bulb.

(5) X-ray emission rate

The X-ray emission rate was determined by UL standard.

EXAMPLE 1

A CRT glass panel of a substantially rectangular shape was formed by a conventional molding process by using a glass composition having an X-ray absorption coefficient($\mu$) of 34cm$^{-1}$ at a wavelength of 0.6 Å. The maximum diagonal line length of the face area, D, was 15.4 inches and the thickness of the central face area, T, was 0.295 inch.

After the molding process, the panel glass was maintained at 475° C. for 40 minutes to impart a residual compressive stress of 12 MPa on the face area.

The glass composition contained, based on the total oxides, 57.10 wt % of $SiO_2$, 1.50 wt of $Al_2O_3$, 0.25 wt % of $Li_2O$, 4.86 wt % of $Na_2O$, 10.07 wt % of $K_2O$, 0.1 wt % of (MgO+CaO), 7.91 wt % of SrO, 12.46 wt % of BaO, 4.75 wt % of (ZnO+$ZrO_2$), 0.4 wt % of $TiO_2$, 0.3 wt % of $CeO_2$ and 0.4 wt % of $Sb_2O_3$.

Various properties of the resulting plate were determined and the results are shown in Table I.

COMPARATIVE EXAMPLE 1

A CRT glass panel was formed in a conventional molding process by using a glass composition having an X-ray absorption coefficient($\mu$) of 28 cm$^{-1}$ at a wavelength of 0.6 ° (Samsung Corning Co., Ltd, CP044). D was 15.4 inches and T was 0.295 inch.

After the molding process, the glass panel was annealed at 520° C. for 40 minutes, thereby applying no residual compressive stress on the panel face.

Various properties of the resulting glasses were evaluated and the results are shown in Table I.

COMPARATIVE EXAMPLE 2

The procedure of Comparative Example 1 was repeated except that the dimensions of the panel were changed as shown in Table I Various properties of the resulting glasses were evaluated and the results are shown in Table I.

EXAMPLE 2

The procedure of Example 1 was repeated except that the dimensions of the panel were changed as shown in Table I.

Various properties of the resulting glasses were evaluated and the results are shown in Table I.

COMPARATIVE EXAMPLES 3 and 4

The procedure of Comparative Example 1 was repeated except that the dimensions of the panel were changed as shown in Table I.

Various properties of the resulting glasses were evaluated and the results are shown in Table I.

TABLE I

| | Ex. 1 | Comp. Ex. 1 | Comp. Ex. 2 | Ex 2 | Comp. Ex. 3 | Comp. Ex. 4 |
|---|---|---|---|---|---|---|
| D (inch) | 15.4 | 15.4 | 15.4 | 28.5 | 28.5 | 28.5 |
| T (inch) | 0.304 | 0.304 | 0.374 | 0.393 | 0.393 | 0.492 |
| Seal edge thickness (inch) | 0.295 | 0.295 | 0.335 | 0.381 | 0.381 | 0.448 |
| Weight reduction parameter (K) | 0.077 | 0.077 | 0.095 | 0.074 | 0.074 | 0.092 |
| Max. vacuum tensile stress (kgf/cm$^2$) | 112 | 112 | 72 | 130 | 130 | 85 |
| $\mu$ (0.6 Å) (cm$^{-1}$) | 34.4 | 28 | 28 | 34.4 | 28 | 28 |
| Residual compressive stress of panel face (MPa) | 12 | 2 | 1 | 14 | 1 | 2 |
| Hydrostatic pressure (MPa) | 3.5 | 2.6 | 3.0 | 3.1 | 2.2 | 2.7 |
| X-ray emission rate (mR/hr) | 0.4 | 1.9 | 0.5 | 0.4 | 1.5 | 0.5 |

Note:
D is the maximum length of diagonal line of the face of the panel glass; and T is the thickness of the center of the face area in inches.

As shown in Table I, as the weight reduction parameter is reduced, the maximum vacuum tensile stress, i.e, the maximum static stress applied by the pressure difference between the outside atmosphere, increases. That is, as the thickness of the glass panel decreases, the panel is required to be stronger.

The strength of the glass panel may be indirectly evaluated by the hydrostatic pressure test. When a residual compressive stress of 12 or 14 MPa is applied to the panel face as in Example 1 or 2, the hydrostatic pressure increases as compared with Comparative Examples 1 to 4.

Further, the glass panels of Comparative Examples 1 and 3, which are made of conventional glass composition show X-ray emission rates of 1.9 and 1.5 mR/hr, respectively, which exceed the regulated level of 0.5 mR/hr. In contrast, the inventive plate of Examples 1 and 2 which are made of a glass composition having an X-ray absorption coefficient($\mu$) of 34.4 cm$^{-1}$ show reduced X-ray emission rates that are below the regulated level.

While the invention has been described with respect to the specific embodiments, it should be recognized that various modifications and changes may be made by those skilled in the art to the invention which also fall within the scope of the invention as defined by the appended claims.

What is claimed is:

1. A substantially rectangular glass panel for a cathode ray tube, characterized in that: the panel is made of a glass having a linear X-ray absorption coefficient of at least 34 cm$^{-1}$ at a wavelength of 0.6 Å; the dimensions of the panel satisfy the condition of $0.07 \leq T/\text{sqrt}(D) \leq 0.09$; and the panel is prestressed so that the surface of the face of the panel has a residual compressive stress ranging from 5 to 25 MPa, wherein T is the central thickness of the face of the panel in inches and D is the maximum diagonal line length of the face of the panel in inches.

2. The glass panel of claim 1, wherein the glass comprises, based on the total oxides, 56.0 to 58.5 wt % of $SiO_2$, 11.0 to 13.0 wt % of BaO, 7.5 to 9.0 wt % of SrO, 2.5 to 3.5 wt % of $ZrO_2$, 1.0 to 2.5 wt % of ZnO, 0 to 0.5 wt % of $Li_2O$, 4 to 7.5 wt % of $Na_2O$, 7 to 11 wt % of $K_2O$, 1 to 3 wt % of $Al_2O_3$, 0 to 0.2 wt % of MgO, 0 to 0.3 wt % of CaO, 0.3 to 0.5 wt % of $TiO_2$, 0.2 to 0.5 wt % of $CeO_2$, and 0.2 to 0.5 wt % of $Sb_2O_3$.

3. The glass panel of claim 1, wherein the constituents of the glass satisfy the following formulae (II) to (IV):

$$0.58 \leq C_{BaO}/(C_{BaO}+C_{SrO}) \leq 0.62 \quad \text{(II)}$$

$$4.5 \leq C_{ZrO2}+C_{ZnO} \leq 6.0 \quad \text{(III)}$$

$$0.52 \leq [C_{K2O}/(C_{K2O}+C_{Na2O})]-0.43 C_{Li2O} \leq 0.58 \quad \text{(IV)}$$

wherein $C_{BaO}$, $C_{SrO}$, $C_{ZrO2}$, $C_{ZnO}$, $C_{K2O}$, $C_{Na2O}$ and $C_{Li2O}$ represent the contents in percent by weight of BaO, SrO, $ZrO_2$, ZnO, $K_2O$, $Na_2O$ and $Li_2O$, respectively.

4. A cathode ray tube comprising a glass panel of claim 1.

* * * * *